United States Patent [19]

Rickert

[11] Patent Number: 4,477,755
[45] Date of Patent: Oct. 16, 1984

[54] METHOD OF SUPPRESSING SEEK-EXCITED VIBRATION IN A DISK DRIVE OR SIMILAR SERVO SYSTEM

[75] Inventor: David W. Rickert, Boulder, Colo.

[73] Assignee: Storage Technology Corporation, Louisville, Colo.

[21] Appl. No.: 392,488

[22] Filed: Jun. 28, 1982

[51] Int. Cl.$^3$ .......................... G05B 5/01; G05B 23/02
[52] U.S. Cl. .................................... 318/611; 318/565; 360/78
[58] Field of Search .......... 360/78; 364/553, 149-151; 318/561, 565, 611, 615, 620, 621, 671, 672, 687, 135, 128, 636, 601

[56] References Cited

U.S. PATENT DOCUMENTS 4,133,011 1/1979 Kurzweil ........................ 318/561 X
4,219,767 8/1980 Wimmer ......................... 318/611 X Primary Examiner—J. V. Truhe
Assistant Examiner—Patrick Keane
Attorney, Agent, or Firm—Bryant R. Gold

[57] ABSTRACT

A disk drive control circuit designed to eliminate undesirable mechanical resonances that occassionally occur in the disk drive system as a result of a particular combination of seek commands. The control circuit uses an electrical model of the mechanical system in order to estimate or predict whether a particular seek command is likely to excite a mechanical resonance. The electrical model may be a filter network having frequency response characteristics similar to the mechanical system. The current used to drive a linear motor of the mechanical system is then applied to the filter network. The signal output from the filter network, which network effectively models the mechanical system, is thus representative of the mechanical response of the system upon performance of the seek operation. This signal output is monitored, and if it exceeds a predetermined threshold level, steps are taken to alter the system response so as to avoid exciting the mechanical resonance.

9 Claims, 8 Drawing Figures

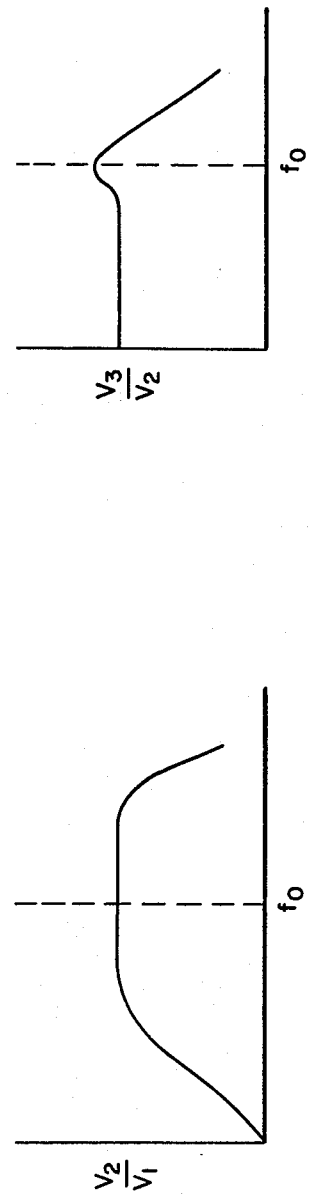
FIG. 4C
FIG. 4B
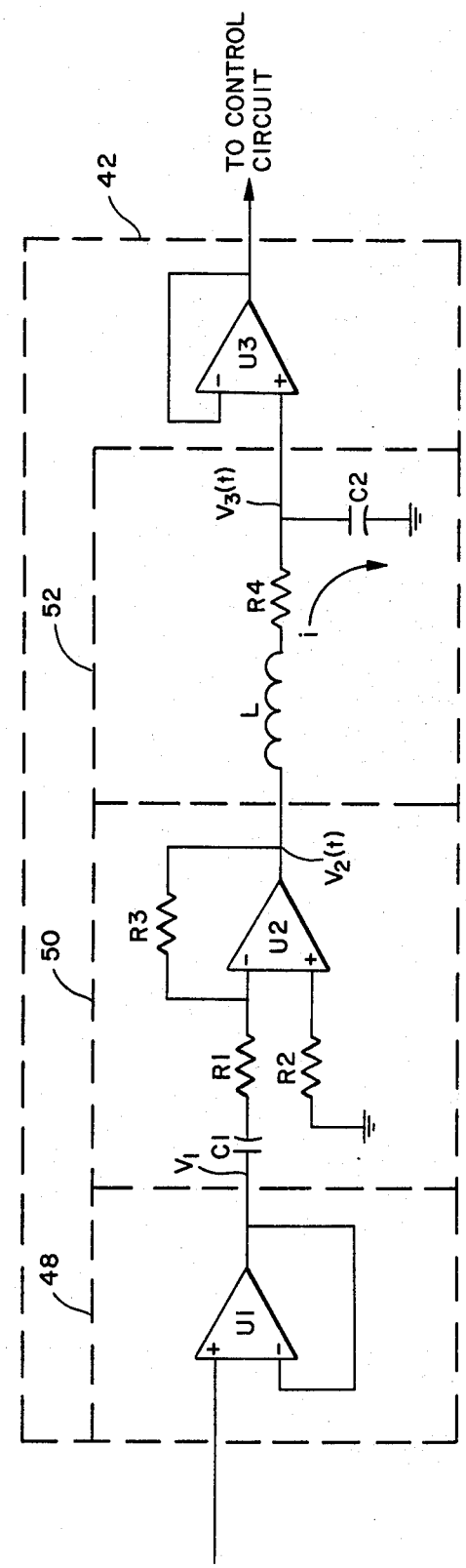
FIG. 4A

METHOD OF SUPPRESSING SEEK-EXCITED VIBRATION IN A DISK DRIVE OR SIMILAR SERVO SYSTEM

BACKGROUND OF THE INVENTION

This invention relates to electronic means for controlling mechanical vibration (typically due to resonances) in disk drive servo systems or similar servo systems. In particular, the invention is described with reference to a servo system used to drive a head assembly radially with respect to rotatable disk storage media, and comprises a method whereby mechanical vibration excited by forces due to a particular severe combination of seek commands can be prevented. Advantageously, prior knowledge of what particular seek commands cause the vibration is not required.

It is presently common practice in the data processing industry to store large quantities of data in digital form upon rotating storage media. Such disk storage media has heretofore been realized with magnetic media, although significant strides are presently being taken to utilize an optical storage disk for this same purpose.

Regardless of the type of disk or media that is employed, i.e., magnetic or optical, some type of read/write head, typically one for each side of each disk, must be moved in and out radially with respect to the disk in response to machine commands. The heads are part of a head assembly and the head assembly is moved as an integral unit until the particular read or write head is positioned at the distance from the center of the disk where the particular record sought to be read or written is located.

It is, of course, very desirable to provide storage media with as much data storage capacity as possible. To this end, it is desirable to locate data tracks on the disk storage media as close to one another as possible. This means that the drive means used to move the head assembly radially with respect to the disk must be accurately controlled. The usual drive choice is a servo system in which a motor, typically a linear motor (although other types of motors or actuators could be employed), is used to drive the head assembly back and forth with respect to the disk, and in which position signals relative to the actual position of the head assembly are generated by sensing, with an appropriate transducer, permanently encoded position information on the disk itself, thereby providing an accurate position sensing means. The information gained from the transducer as to the actual position of the head assembly relative to the disk is then compared to a desired location on the disk where desired data is to be found or written. This combined information is then used to generate a position command which is used to control the action of the linear motor such that the head assembly is radialy moved with respect to the disk until the desired position is reached. Such "feedback" servo systems are well known in the art.

The high performance requirements of modern data storage media pose considerable difficulty, however, to conventional "feedback" servo systems. For example, it is desirable to treat disk storage media as "Random Access Memory"—that is, memory which may be non-sequentially accessed—which requires that the access time of the disk storage media be as short as possible. If this facility is to be economically feasible with today's high speed computers, the servo system must be increasingly accurate and fast. This in turn leads to difficulties with mechanical vibration that develops in the servo system, including the head assembly.

With magnetic disk, in order that the data may be packed densely thereon, it is necessary that the magnetic heads "fly" on the magnetic surface on an air bearing having a thickness on the order of several microinches. Clearly, only a minor vibration is required to destroy such a delicate air bearing, and it is therefore essential that excitation of mechanical resonances be avoided.

With respect to optical disk, the data density is at least an order of magnitude greater than that realized on magnetic disk. The optical heads must have the capability of finding an area or band that is only a few microns wide. Again, only a minor resonance is required to destroy the fine resolution that is required.

A further consideration which must be addressed by a designer of a servo system is the accurate position of the head assembly relative to the disk so that data can be reproducablly read or written onto specific areas of each individual disk. This consideration requires that the position-sensing transducer employed be extremely accurate and repeatable. Again, mechanical vibration can cause such transducers to produce inaccurate data.

Numerous systems have been proposed in the prior art for generating accurate position sensing information. For example, see e.g., U.S. Pat. No. 3,820,712 to Oswald for "Electronic Tachometer"; and U.S. Pat. No. 4,321,517 to Touchton et. al. for "Resonance Suppression Method." The Oswald reference, however, does not address the problem of mechanical resonance or vibration. The Touchton reference does address the suppression of resonances that occur during a seek operation ("seek" being hereinafter defined as the process of moving the head assembly from one location or band on the disk to another location or band), but does not address the problem of mechanical vibration or resonances that result from a particular combination of seek commands.

Because the disk is operated as a "Random Access Memory," the seek commands are likewise random. However, because the slidable head assembly represents a mechanical system having a resonant frequency, it is possible that a particular sequence of seek commands will excite a tuned condition or mechanical resonance of the mechanical system. Such excitation may cause the head assembly to undergo large vibrations which can either cause errors or limit the track density. Because such seek-excited resonances are really not detectable until after the fact i.e., after the seek operation has been completed, the only way to deal with such resonances is to allow them to die out before initiating the next seek operation. However, to add a time delay after each seek command that is sufficient for a seek-excited resonance to dampen out seriously degrades the overall seek performance (speed) of the machine. Thus, there is a need in the art for a method of predicting or estimating when such seek-excited resonances will occur and for breaking up the seek pattern only in those relatively few instances where seek-excited resonances are likely to occur.

SUMMARY OF INVENTION

It is therefore a primary object of the present invention to provide an improved servo system for accurately positioning one mechanical member relative to another mechanical member wherein a seek command, or sequence of seek commands, that might excite an undesirable mechanical resonance, can be early detected and controlled.

A second object of the present invention is to provide such an improved servo system especially adapted for driving a head assembly radially with respect to a rotating disk medium.

A third object of the invention is to provide improved controls for such a servo system that predict when such undesirable mechanical resonances in the head assembly are likely to occur as a result of the particular sequence of commands that is being executed, thereby providing an early indication that corrective action needs to be taken.

A fourth object of the invention is to provide such improved controls for a servo system of the type described above wherein appropriate corrective action is automatically taken in order to prevent the occurance of the undesirable tuned condition.

The above and other objects of the present invention are realized by including within the servo control circuitry an electrical model or "analog" equivalent of the disk drive, or other, mechanical system. For a disk drive system, this mechanical system is typically made up of a head assembly that is slidably mounted to a base member to which a disk media member is also rotatably mounted. In such a system, the head assembly moves radially, under servo control, with respect to the disk. The electrical model circuit typically comprises a filter network having a frequency response characteristic similar to that of the mechanical system. A linear motor positions the head assembly radially with respect to the disk. A signal which is proportional to the current delivered to the linear motor is applied to the electrical model circuit. Because the motor current is proportional to the force applied to the mechanical system, and because the filter network effectively models the mechanical system, the signal output from the filter network is representative of the mechanical response of the head assembly as the seek operation is performed. This signal output is monitored, and if it exceeds a predetermined threshold, indicating that a mechanical vibration or resonance is likely, appropriate control means can be initialized for altering the system response in order to avoid further exciting the mechanical resonance.

BRIEF DESCRIPTION OF THE DRAWINGS

The invention will be better understood by reference to the accompanying drawings in which:

FIG. 4A shows an electrical circuit that represents a model of the mechanical system of FIG. 3 with the addition of a buffered prefilter, and thus FIG. 4A represents exemplary circuitry that could be used to realize the electrical circuit of FIG. 1;

FIGS. 4B and 4C represent typical frequency responses associated with various blocks of FIG. 4A.

DETAILED DESCRIPTION OF THE INVENTION

The present invention is best understood by reference to the Figures wherein like numerals are used to represent like parts or components throughout.

Figure 1:
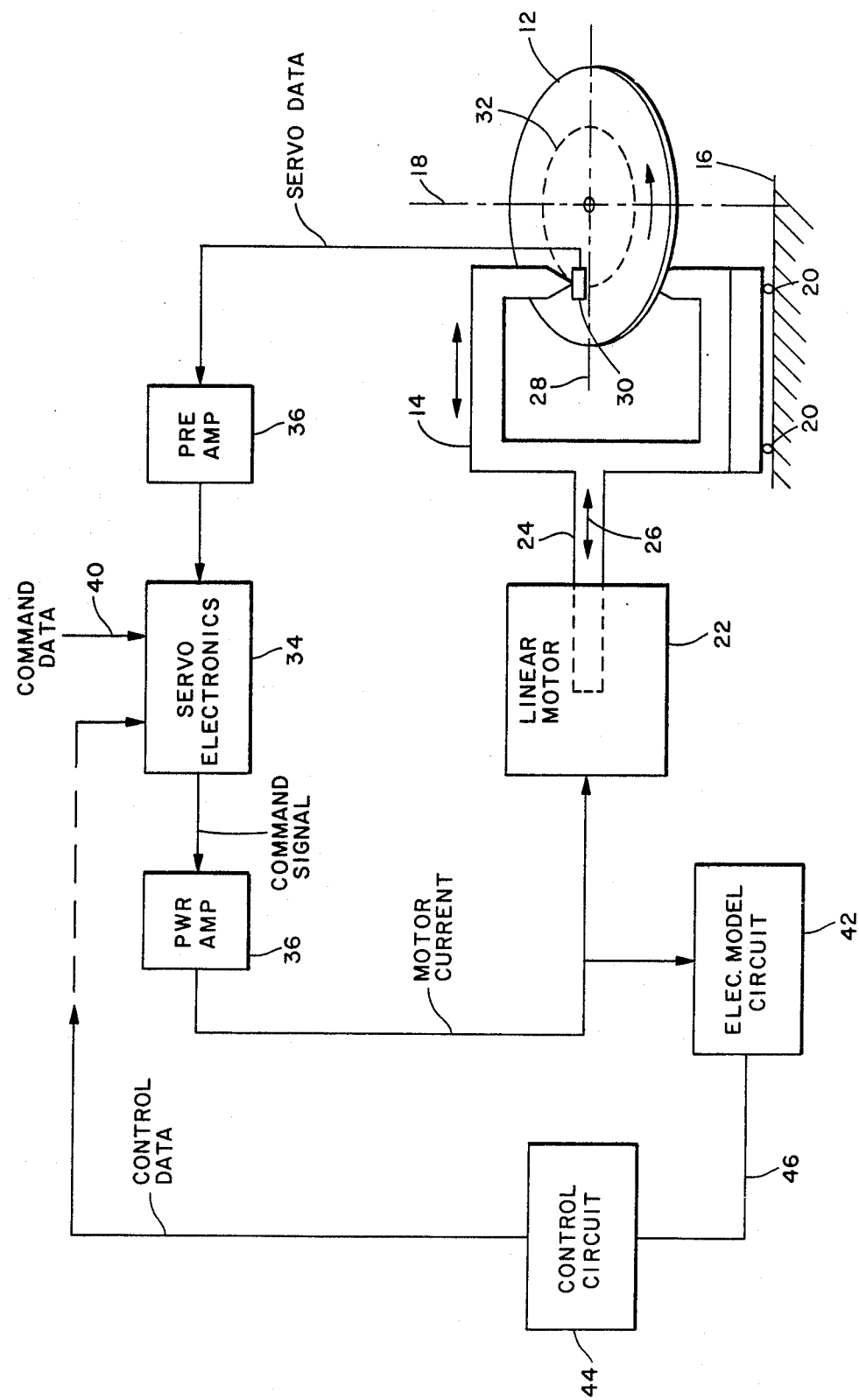
FIG. 1 is a block diagram of a servo system that employs the concepts of the present invention, and includes a schematic view of the servo driven head assembly showing the motion of the assembly relative to a disk member.

There is shown in FIG. 1 a block diagram of a servo system that employs the concepts of the present invention. Included in FIG. 1 is a schematic view of the relationship between a rotating disk media 12 and a slidable head assembly 14. The disk media 12 is rotatably mounted to a base plate 16 such that the disk may rotate about an axis 18. Numerous methods could be employed by those skilled in the art in order to realize this rotatable mounting. For purposes of this invention, it is not important which particular method might be used.

The head assembly 14 is slideably mounted to the base plate 16. This slideable mounting is symbolically depicted in FIG. 1 through the use of bearings or rollers 20. However, it is to be understood that any appropriate slideable mounting means could be used. A linear motor 22 activates a plunger 24 that is affixed to the head assembly 14. By delivering a motor current to the linear motor 22 of the desired polarity, the plunger 24 can be made to linearly move in a desired direction as indicated by the double headed arrow 26. Thus, by applying a motor current of the desired polarity to the motor 22, the head assembly 14 moves linearly along a radial axis 28 of the disk 12. This radial movement, in turn, allows a read/write head 30 to be positioned over a desired band of data 32 of the disk 12.

Typically, several data bands 32 will be selectively placed on the surface of the disk 12. These bands provide encoded information that, when read by the head 30, provide servo position data to the servo electronics 34 in order to specify the present location of the head 30 relative to the surface area of the disk 12.

Magnetic disks typically include a plurality of disks 12 attached to a common spindle. The head assembly 14 thus has a plurality of heads 30 attached thereto, at least one head for each side of each disk. For example, it is common to employ 4 disks attached to a common spindle that rotates about an axis 18. The head assembly for such a multi-disk configuration would thus include eight heads, one to access each side of each disk. Such a multi-disk head assembly would move all eight heads at the same time radially with respect to the disks. One surface of one disk is typically dedicated to having servo position information prewritten thereon in order to provide the necessary feedback for the servo system to operate.

Other types of magnetic media, e.g., floppy media, typically include only one disk 12. Servo position information may thus be obtained from bands of servo data that are selectively spaced throughout the disk 12, or through other suitable transducer means. Optical disks, which are under much developmental work, also employ a variety of transducers in order to provide servo position data to the servo system. However, as presently contemplated, it is believed that most optical media will have at least some bands of servo data 32 prewritten on the disk 12. The optical head 30, as well as the head assembly 14, can then be selectively moved by the linear motor 22 in order to seek out these particular bands of servo data in order to control the head's position relative to the disk. Bands of information data, having a known relationship with respect to the bands of servo data, can then be accessed in order to seek out desired data.

The servo data as read by the head 30 is typically amplified in a pre-amplifier 36 and then presented to the servo electronics 34. The servo electronics compare the servo position data to command data, which command data identifies the location on the disk 12 where desired information is to be found. By comparing these two sets of data—command data which indicates where the head assembly should be, and servo data which indicates where the head assembly is—the servo electronics are able to generate an appropriate drive signal that is delivered to a power amplifier 36. The power amplifier 36, in turn, converts the drive signal to an appropriate control signal (e.g., motor current) that drives the plunger 24 of the linear motor 22 to the desired position.

Those skilled in the art will recognize that the above description is greatly simplified. The servo electronics 34 can be quite complex, and include the capability of extracting velocity data as well as position data from the servo data which is read by the head 30. Furthermore, in order to have the head assembly 14 seek out a location on the disk 12 as rapidly as possible, the command signal is a complex signal that will: (1) accelerate the linear motor as rapidly as possible; (2) drive the linear motor at the fastest possible velocity to a region near the desired location; (3) decelerate (brake) the linear motor as smoothly as possible as the desired region on the disk 12 is approached; and (4) stop and hold the plunger 24 of the linear motor at the desired location once reached. Further detail with respect to exemplary servo electronics 34 can be found, for example, in U.S. Pat. No. 4,321,517.

As described thus far, the operation of the servo system in FIG. 1 is conventional. External command data is received within the servo electronics 34 over signal line 40. This command data initiates a new "seek" operation which causes the head assembly 14 to position the head 30 over a new location or band of the disk 12. Once this location has been reached, and the desired information has been written onto or extracted from the desired location of the disk 12, a new seek command is received over signal line 40, and the process repeats itself.

In the process of responding to a sequence of command signals, the head assembly 14 is moved back and forth radially with respect to the disk 12 in a random fashion. Each seek operation starts with the head assembly 14 (and head 30) at a stopped position. Each seek operation ends with the head assembly 14 or 30 having been moved from its initial stopped position to a final stopped position. Thus, the overall movement of the head assembly 14, in responding to a sequence of seek commands, is a random sequence of start/stop operations. Unfortunately, if a particular sequence of seek commands is executed, this start/stop or "jerky" movement can easily excite mechanical resonances in the mechanical system, this mechanical system comprising the head assembly 14 being slidably mounted to the base plate 16. The present invention is directed to a means of predicting when these undesirable mechanical resonances will occur, and a means for taking corrective action in order to prevent such mechanical resonances from being excited.

Fortunately, the particular sequence of seek commands that would excite the mechanical resonances within the mechanical system typically occurs only very infrequently. While such infrequent occurance is fortunate from the standpoint of having the undesirable resonances only infrequently excited, it is also unfortunate in that it is hard to justify elaborate, expensive corrective measures in order to prevent or control an event which only occurs infrequently. The problem is compounded by the fact that there is no way to reliably or statistically predict when such resonances will occur. They are entirely a function of the sequence of seek commands that are applied to the system. This sequence of seek command is, in turn, entirely a function of the user's particular needs, which needs are typically random, and therefore unpredictable.

In order to overcome the above problems, the present invention includes the addition of an electrical model circuit 42 and a control circuit 44. The motor current which is used to drive the linear motor 22, and which is representative of the force applied to move the head assembly, is used as an input to the electrical model circuit 42. This model circuit 42 advantageously provides an electrical model of the mechanical system. A signal output from the model circuit 42, appearing on line 46, thus represents an estimate of the vibration from the mechanical system. The mechanical system, which includes the head assembly 14 slideably mounted to the base plate 16, with the head assembly 14 being driven by the linear motor 22, linearly displaces the head 30 along the radial axis 28. This displacement is realized by applying a linear force to the plunger 24, which linear force is created by applying the motor current to the linear motor 22. Because the motor current is directly proportional to the force that is developed within the linear motor 22, the overall mechanical system may be thought of as a system wherein the motor current (force), as an input, produces linear displacement, as an output. Because the electrical model circuit 42 selectively models the mechanical system, the input to the electrical model circuit (motor current) produces an electrical output signal that is proportional to the mechanical output, linear displacement, of the mechanical system. Thus, by monitoring the output of the model circuit 42 with a control circuit 44, it is possible to determine when a mechanical vibration is likely to occur. That is, if a resonance condition is to be excited by a particular sequence of seek commands, the output of the electrical model circuit 42 will typically peak in amplitude. The control circuit 44 can be adapted to sense this peaked condition and generate appropriate data or signals in response thereto that can initiate corrective action.

Various types of corrective action could be employed by the present invention. Probably the simpliest and preferred form of corrective action is to merely delay the beginning of the next seek command for some period of time, thereby allowing the mechanical resonance to sufficiently damp out before a new force is applied to the mechanical system. Because such mechanical resonances will occur only infrequently, such a delay would not significantly degrade the overall performance (e.g., speed) of the disk drive system. The delay could be a predetermined delay period, as is set for example by a timing circuit within the control circuit 44, in which case the control data would merely disable the seek command for the set period of time; or, the period of time could be determined by however long it takes for the mechanical resonance to sufficiently damp itself out, as measured by monitoring the output of the electrical model circuit 42. In the latter case, this time period could be multiplied by an appropriate scale factor, if needed, in order to account for scale factor differences, if any, between the electrical model circuit 42 and the mechanical system.

Figure 2:
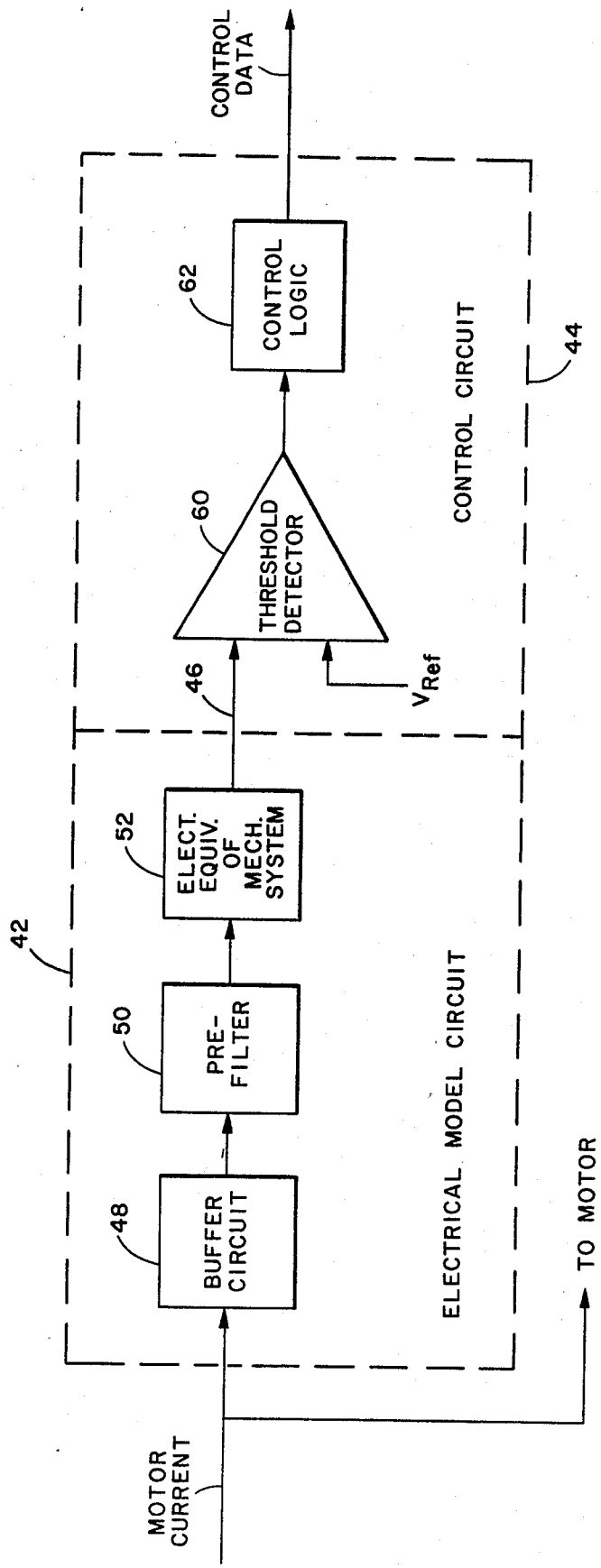
FIG. 2 shows a more detailed block diagram of the electrical model circuit and control circuit of FIG. 1.

FIG. 2 represents a more detailed block diagram of the preferred embodiment of the electrical model circuit 42 and the control circuit 44. The electrical model circuit 42 includes a buffer circuit 48, a pre-filter network 50, and a circuit network 52. The circuit network 52 is representative of the electrical equivalent of the mechanical system). The function of the buffer circuit 48 is merely to convert the motor current to an equivalent voltage signal so that all of the motor current generated by the power amplifier 36 (needed by the linear motor 22 in order to generate the requisite forces to move the head assembly 14) is delivered to the motor and not lost to the electrical circuit 42. The pre-filter 50 is typically a by-pass filter that filters out low and high frequencies well below and above, respectively, the resonant frequencies of concern from the output of the buffer circuit 48.

Figure 3:
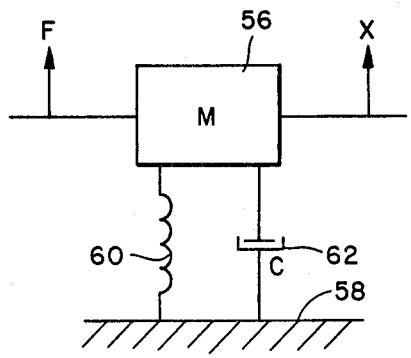
FIG. 3 represents a simplified mechanical model of the head assembly.

The electrical equivalent of the mechanical system 52 is, as its name implies, an electrical circuit that models the mechanical system. For example, the mechanical system, comprised of the head assembly 14 slideably mounted to the base plate 16, could be simply modeled as shown in FIG. 3. Here, a mass 56 (which represents the combined mass of the head assembly 14 and plunger 24) is coupled to a base plate 58 by means of a spring 60 and a dashpot 62. The spring 60, having a spring constant k, is representative of the linear forces internal to the system that move or hold the head assembly to a desired position. The dashpot 62 is representative of the damping that occurs within the system as a result of the slideable mount 20 and any other friction present within the system. The force F represents the external input to the mechanical system used to move and hold the mass 56. The output is linear displacement, designated as x, and represents the linear displacement along the radial axis 28.

Those skilled in the art will recognize that the performance of the mechanical system represented in FIG. 3 (that is, a description of what the output x will do as a function of the input F) can be described by a set of differential equations. It is also known in the art that an equivalent system to that shown in FIG. 3. (that is, a system having a similar set of equations to describe its performane) can be realized using electrical components. Such a circuit is shown in FIG. 4A. Also included in FIG. 4A is a pre-filter network 50 and a buffer circuit 48. The circuits shown in FIG. 4 are thus representative of exemplary circuitry which could be used within the present invention to realize the electrical model circuit 42.

In FIG. 4A, a conventional operational amplifier U1 may be used to realize the buffer circuit 48. Similarly, another operational amplifier U2 may be used with capacitor C1 and resistors R1, R2, and R3 in order to realize the pre-filter network 50. This pre-filter network 50 is advantageously designed to have a frequency response, "V2/V1", similar to that shown in FIG. 4B. The filter network 52 is the electrical equivalent of the mechanical system of FIG. 3. Electrical and mechanical parameters relating to FIGS. 4A and 3 respectively are compared in Table 1.

TABLE 1

| Comparison of Electrical and Mechanical Parameters | |
|---|---|
| Electrical | Mechanical |
| (FIG. 4A) | (FIG. 3) |
| V2(t), voltage source (volts) | F, force (lbs) |
| L, inductance (henries) | M, mass (lb/sec$^2$/in) |
| C2, capacitance (farads) | 1/K, compliance (in/lb) |
| R4, resistance (ohms) | C, damping (lb/sec/in) |
| i, current (amps) | v, velocity (in/sec) |
| q, charge (coulomb) | x, displacement (in) |
| $q = \int_o^t i\, dt$ | $x = \int_o^t v\, dt$ |

Operational amplifier U3 may be used as a buffer circuit to interface the output of the filter network 52 with the control circuit 44. Alternatively, op. amp. U3 could be configured by those skilled in the art to realize the threshold detector 60, thereby reducing the number of components required to realize the model circuit 42 and control circuit 44.

Turning to FIG. 2, it is seen that the output of the network 52 is delivered over signal line 46 to a threshold detector 60. The threshold detector 60 compares the output response of the electrical model circuit 42 to a reference signal $V_{Ref}$. The threshold detector 60 may be of conventional design and is adapted to change states whenever the signal appearing on line 46 exceeds the reference voltage $V_{Ref}$. Hence, control logic 62, which monitors the output of threshold detector 60, can be used to generate the appropriate control data whenever the output of the threshold detector has changed states.

Figure 5A:
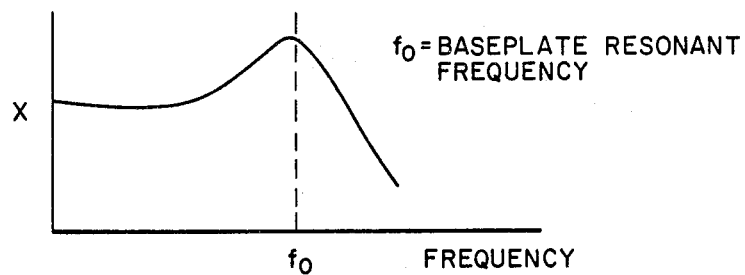
FIGS. 5A and 5B represent respectively the typical frequency response characteristics of the head assembly and the electrical model therefor.

FIG. 5A represents the frequency response characteristics of the mechanical system used within the disk drive. The vertical axis of FIG. 5A represents the output of the mechanical system, or the linear displacement. (Sometimes, it is common to have the vertical axis represent the ratio of the output to the input, as in FIGS. 4B and 4C, thus taking into account any variations that may occur in the amplitude of the input signal. For purposes of FIGS. 5A and 5B, it is assumed that the amplitude of the input signal is held contant.) The horizontal axes represents the frequency of the output response. That is, as the input driving function (force, or motor current, in the case if FIG. 5A) slowly increases in frequency, the output response, will follow the input. However, as the frequency gets higher and higher, a point is reached where the output can no longer track the input. Hence, the output response drops off significantly. Before doing so, however, the output response may very well peak in amplitude at a point designated as $f_o$ in FIGS. 5A and 5B. It is this peaking of the output response which represents the undesirable resonance conditions which must be avoided.

Figure 5B:
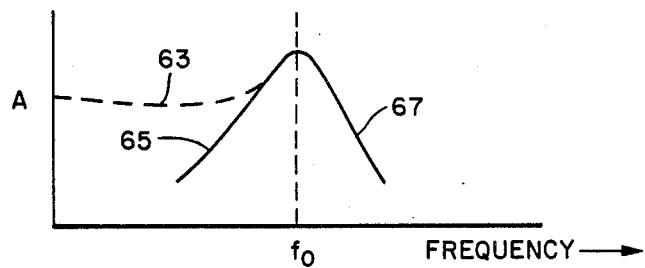

In FIG. 5B, the frequency response characteristic of the electrical model circuit of FIG. 4 are shown. Without the pre-filter network 50, the response would follow the dotted line indicated by 63. However, the pre-filter network 50 causes the frequency response to follow the line identified as 65. It is to be noted, however, that the response of the output, designated as A (for amplitude) along the vertical axis of FIG. 5B, peaks at a corresponding frequency $f_o$ as that of the mechanical system. Thereafter, as the frequency continues to increase, the response drops in amplititude as shown at 67, as does the frequency response of the mechanical system. For purposes of this invention, therefore, the frequency response characteristics of the electrical model circuit as shown in FIG. 5B are equivalent to the frequency response characteristics of the mechanical system as shown in FIG 5A for the frequencies of concern.

As thus described, a system and method have been presented that allow undesirable resonance conditions resulting from a unique sequence of seek commands to be early detected and corrected. No elaborate circuitry or expensive and troublesome transducers have been used in order to realize the invention. Rather, relatively simple circuitry has been employed in a unique manner in order to produce a long felt need—elimniating undesirable resonances that infrequently occur as a result of a particular sequence of seek commands. One might ask why the head 30 could not be used to detect when a resonance condition has been excited. That is, when a resonance condition has been excited, the whole head assembly 14, including the head 30, will be vibrating back and forth. This vibration could be detected by monitoring the servo position data received from the head 30. Indeed, this has been the approach in the prior art to sense when the head 30 is at the desired location and to sense if oscillations or vibrations are present. One problem with this approach, however, is that the mechanical resonance is not sensed until the servo is in its "position mode", meaning that the head assembly 14 has already been moved by the servo in its "velocity mode" the major portion of the distance associated with the seek command, and now the servo is zeroing in on the final position. Thus, if the resonant condition is excited at the beginning of the seek command, while the servo is in the velocity mode, the resonance condition could go undetected. Further, where multiple disks are employed and attached to a common spindle, as is common in magnetic disk, the head 30 that provides servo data to the servo system is only connected to one arm of the head assembly 14. Hence, there is no servo position data available with respect to the other arms of the head assembly 14 that could be used to detect an undesirable vibration or oscillation. Finally, there is the problem of not being able to sense a resonance condition until it is actually present. With the present invention, appropriate scaling can be used within the electrical model circuit 42 to enable the predicted output response (on signal line 46) to occur prior to the time that the head assembly 14 has actually completed its seek operation. Thus, an early warning can be given that a resonance condition is likely to be excited, and appropriate corrective action can be timely taken.

While the present invention herein disclosed has been described by means of specific embodiments and applications thereof, numerous modifications and variations could be made thereto by those skilled in the art without departing from the spirit and scope of the present invention. For example, the present invention could easily be adapted for use with any type of servo system where a first member (such as a head assembly) must be accurately positioned with respect to a second member (such as storage media of any type). It is therefore to be understood that within the scope of the appended claims, the invention may be practiced otherwise than as specifically described herein.

What is claimed is:

1. A disk drive control circuit for use with a disk drive that includes a rotatable disk and means for writing or reading information to or from selected locations of said disk, said write or read means including a mechanical system that selectively positions a head assembly so as to provide access to selected locations of said disk, said disk drive control circuit comprising:
   an electrical circuit that comprises a model of said mechanical system;
   means for exciting said electrical model circuit with a drive signal representative of the mechanical forces applied to said mechanical system in order to selectively position said head assembly, said electrical model circuit being adapted to provide a response signal that is representative of the displacement of said head assembly within said mechanical system;
   alarm means for monitoring said response signal and generating an alarm signal whenever said response signal exceeds a predetermined threshold; and
   control means responsive to said alarm signal for preventing the movement of said head assembly for a period of time;
   whereby undesirable mechanical resonances associated with a particular sequence of head assembly positioning cycles can be stopped by selectively delaying the movement of said head assembly.

2. A disk drive control circuit as defined in claim 1 wherein the mechanical forces applied to said mechanical system are generated by a linear actuator that linearly moves a plunger in response to a drive current, said head assembly being mechanically coupled to said plunger, and further wherein said drive signal is derived from said drive current.

3. A disk drive control circuit as defined in claim 2 wherein said alarm means comprises a threshold detector circuit adapted to generate said alarm signal whenever said response signal, applied to a first input of said threshold detector circuit, has an amplitude that exceeds a reference voltage applied to a second input of said threshold detector circuit.

4. A disk drive control circuit as defined in claim 2 wherein said period of time during which the movement of said head assembly is prevented is a pre-determined fixed period of time.

5. A disk drive control circuit as defined in claim 2 wherein said period of time during which the movement of said head assembly is prevented is whatever time is required for said response signal to settle below said predetermined threshold.

6. An improved disk drive system comprising:
   a base plate;
   a disk rotatably mounted to said base plate, said disk having servo positioning data selectively placed thereon;
   a head assembly slidably mounted to said base plate, said head assembly being adapted to read data from said disk;
   linear positioning means for linearly positioning said head assembly along a radial axis of said disk in response to a drive signal, said linear positioning means comprising a linear actuator having a plunger that is linearly moved in response to a drive current, said drive signal comprising said drive current, and an input signal derived from said drive signal, said input signal comprising a voltage signal that is proportional to said drive current;
   servo means coupled between said head assembly and said linear positioning means for generating said drive signal in response to a servo position command signal and servo positioning data read from said disk by said head assembly;
   an electrical circuit coupled to said servo means, said electrical circuit comprising an electrical model of a mechanical system comprised of said head assembly slidably mounted to said base plate, said electrical circuit being adapted to receive said input signal derived from said drive signal and to generate a displacement signal in response to said input signal, the amplitude of said displacement signal representing an estimate of the relative linear displacement of said head assembly as a function of said drive signal, said electrical circuit model comprising a filter network having a frequency response characteristic approximately the same as the frequency response characteristic of said mechanical system for frequencies near the resonant frequency of said mechanical system, and wherein said electrical circuit model further comprises a pre-filter network coupled to said filter network, and a buffer circuit coupled to said pre-filter network, said buffer circuit being adapted to monitor said drive current and generate said input signal therefrom and to present said input signal to said pre-filter network, and further wherein said pre-filter network filters out frequencies contained within said input signal that are well below the resonant frequency of concern associated with said mechanical system; and a control circuit responsive to said displacement signal for selectively controlling the response of said head assembly to said drive signal whenever said displacement signal exceeds a prescribed threshold;

whereby undesirable resonances associated with a particular sequence of head assembly linear movements can be minimized.

7. An improved disk drive system as defined in claim 6 wherein said buffer circuit, pre-filter network, and filter network are combined into a single, buffered, band-pass network.

8. A method for preventing undesirable mechanical resonances from being excited in a head assembly of a disk drive system as said head assembly seeks out, under servo control, addressed locations on said disk, said method comprising the steps of:

(a) modeling the mechanical system comprising said servo controlled head assembly with an electrical model circuit;

(b) exciting said electrical model circuit with a signal proportional to the force applied by said servo system to said head assembly, which force causes said assembly to seek out the addressed locations of said disk;

(c) monitoring the electrical response of said model circuit to the excitation of step (b), said response being representative of the mechanical response of said head assembly, said response being manifest by an output signal generated by said electrical model circuit; and (d) controlling the movement of said servo controlled head assembly in response to said output signal so as to prevent undesirable mechanical resonances from occurring in the head assembly, said movement controlling step comprising delaying the start of the next seek operation until a perceived mechanical resonance, as sensed by monitoring said output signal, has sufficiently damped out.

9. A method as defined in claim 8 wherein the initialization of the next seek operation is delayed a fixed period of time whenever the amplitude of said electrical model output signal exceeds a prescribed threshold.

* * * * *